United States Patent [19]

Dailey et al.

[11] 3,717,172

[45] Feb. 20, 1973

[54] FLUIDIC INFORMATION STORAGE CELL

[75] Inventors: Jack R. Dailey, Apalachin; Donald F. Jensen, Endicott; Harry C. Kuntzleman, Newark Valley, all of N.Y.

[73] Assignee: International Business Machines Corporation, Armonk, N.Y.

[22] Filed: Dec. 16, 1970

[21] Appl. No.: 98,513

[52] U.S. Cl. ....................137/561, 137/81.5, 235/201

[51] Int. Cl. ....................F15c 3/04

[58] Field of Search.............137/81.5, 561, 599, 608; 251/61.1, 331; 235/201

[56] References Cited

UNITED STATES PATENTS

| | | | |
|---|---|---|---|
| 3,312,238 | 4/1967 | Voit, Jr. | 251/61.1 |
| 3,519,013 | 7/1970 | Amos | 137/81.5 X |
| 3,527,248 | 9/1970 | Pick | 137/608 X |
| 3,433,257 | 3/1969 | Jensen | 137/561 |
| R26,940 | 8/1970 | Norwood | 137/599 |

OTHER PUBLICATIONS

Humphreys, F. R., and Norwood, R. E. "Fluid Actuated Latch", I.B.M. Tech. Disclosure Bulletin, Vol. 8, No. 3, August 1965, pp. 427,428.

*Primary Examiner*—William R. Cline
*Attorney*—Hanifin & Jancin and K. P. Johnson

[57] ABSTRACT

Fluidic circuit using diaphragm valves having particular utility as an information storage cell in either an associative or functional memory in computers. Information is stored in the cell by coincident actuation of a gating line and input bit line to set a latch. Cell interrogation is accomplished by pressurizing either the read line or output bit line depending upon whether searching or readout functions are undertaken. A modification of the cell permits consolidation of input and output bit lines into a single bit line.

7 Claims, 4 Drawing Figures

*INVENTORS*
JACK R. DAILEY
DONALD F. JENSEN
HARRY C. KUNTZLEMAN

*BY* K. P. Johnson
*ATTORNEY*

FLUIDIC INFORMATION STORAGE CELL

BACKGROUND OF THE INVENTION

In the design of storage arrays for digital information, it is desirable to use individual storage cells for data bits which are simple, compact and readily sensed as to content either by conventional or associative addressing. Binary fluidic devices are well known which have the necessary two stable states for digital applications, as evidenced by the variety of latch configurations available.

These devices as storage cells have been satisfactory for many conventional memory applications in which limited quantities of data are to be retained. However, the enlargement of a data store poses a problem with most devices because of the continuous fluid flow required. Supply capacity then becomes complex and costly, especially when the bistable devices are the pure fluid or jet flow type. Another limiting characteristic is the typical requirement of set and reset ducts and ports for achieving each of the stable states within a device. The number of ducts, of course, has a direct effect on the packaging density obtainable.

One of the particular characteristics required of devices in associative type stores is the ability to sense device content along either of two orthogonal directions because of the search and readout modes. The known fluidic devices in simple form are either not designed to accept a high pressure interrogation signal in two directions at the output stage or will not maintain their stable state during such interrogation. The bidirectional capability can be obtained, however, at the expense of adding isolating circuits or active devices to protect the stored information.

Accordingly, a primary object of this invention is to provide a fluidic, binary storage cell that lends itself to use in a matrix memory configuration and permits nondestructive interrogation in either of two orthogonal directions.

Another important object of this invention is the provision of a fluidic information storage cell having low power consumption, particularly desirable for large capacity stores.

Yet another object of this invention is the provision of a fluidic information storage cell in which both the set and reset signal are applied in a single duct.

A further object of this invention is the provision of a fluidic information storage cell which is readily adaptable to both conventional, associative and functional memory applications.

SUMMARY OF THE INVENTION

The foregoing objects are attained in accordance with the invention by providing a bistable valve having a member which responds to input data pressure signals to maintain a flow path through the valve either open or closed. A controlled valve isolates the member from set and reset signals except at selected times. The condition of the bistable valve is indicated by a diaphragm readout valve which has its flow path blocked or open in accordance with the state of the flow path of the bistable valve. By placing the readout valve in a duct connecting two orthogonal access ducts in the matrix, the state of the bistable valve can be readily sensed with interrogation pressure pulses applied along either access duct.

The invention offers a binary storage cell which is advantageously insensitive to the mode of interrogation. This characteristic makes it particularly useful in associative and functional memory applications. Flexible diaphragm valves further require low power consumption because they are primarily pressure sensitive devices with minimal fluid flow. Their operation at low pressures, usually less than 1 psig, permits small size and molded construction with resulting high density packaging which is highly suitable for large memory arrays.

BRIEF DESCRIPTION OF THE DRAWINGS

The foregoing and other objects, features and advantages of the invention will be apparent from the following more particular description of preferred embodiments of the invention, as illustrated in the accompanying drawings wherein.

DESCRIPTION OF THE INVENTION

Figure 1:
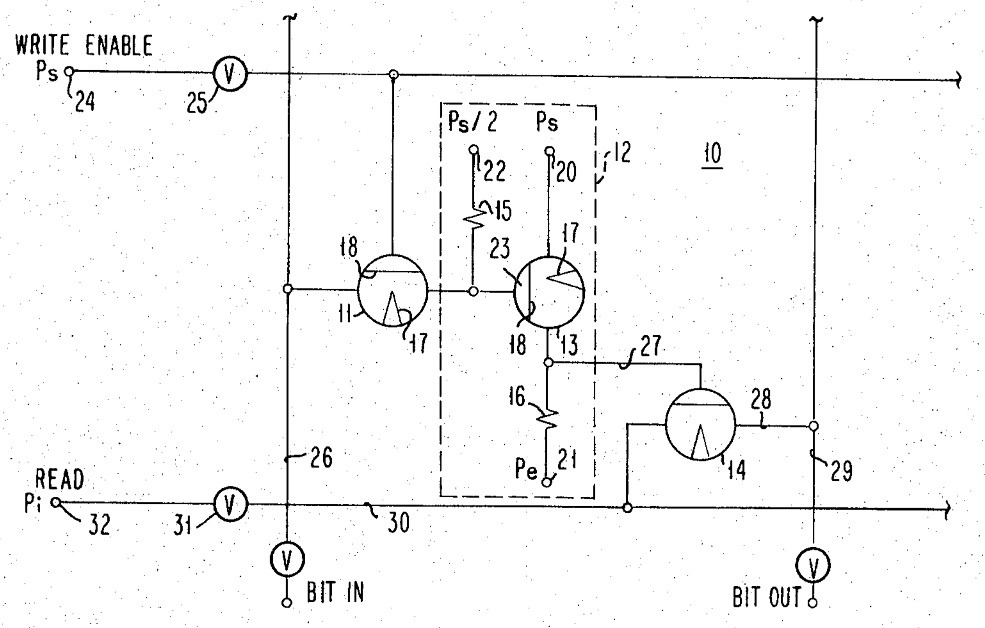
FIG. 1 is a schematic diagram of a basic bistable fluidic information storage cell constructed in accordance with the invention.

Referring to FIG. 1, the fluidic information storage cell 10 of the invention comprises generally an input signal gating device 11, a bistable latching circuit 12 including valve device 13, and an information readout device 14. The cell thus includes diaphragm controlled valves 11, 13 and 14 as active flow control devices and flow restrictors 15 and 16 as passive elements. Each diaphragm controlled device includes a ridge 17 which can cooperate with a movable, flexible diaphragm 18 to close off a fluid flow path through the device. The construction and operation of the diaphragm controlled valves is described in greater detail in U.S. Pat. No. RE26,940, issued Aug. 18, 1970, to R. E. Norwood.

A basic component of the storage cell is the bistable latch circuit indicated generally as 12 within the broken line. This latch circuit is a modification of that shown and described in U.S. Pat. No. 3,433,257, issued to D. F. Jensen on Mar. 19, 1969. Briefly, the latch function is obtained in a diaphragm valve device by providing a biasing force urging the diaphragm to close off the flow path which is greater than the opposing force of fluid pressure on the flow path when the path is closed. This is accomplished by providing a biasing pressure which is less than the source pressure of the flow path fluid and locating the ridge sufficiently upstream so that the required force balance is obtained through the opposing pressures and the diaphragm areas subjected to those pressures. Input signal pressure is used to either augment or counteract the bias pressure and thereby change the control force on the diaphragm.

In circuit 12, fluid is supplied to duct 20 from a source at pressure $P_s$ to flow into and through valve 13, restrictor 16, exhausting at duct port 21 at pressure Pe. Fluid Ps/2 at a pressure of approximately one-half the difference between the supply and exhaust pressure is supplied at duct port 22 as a bias pressure in control chamber 23 urging diaphragm 18 toward the ridge 17. Valve 13 is in one stable state with the diaphragm as shown so that fluid flows from the supply port 20 to exhaust port 21. The other stable state is obtained when the diaphragm is contacting ridge 17 to close off the flow path. Assuming the diaphragm was moved to that position with supplementary signal pressure, ridge 17 is located sufficiently upstream so that the bias pressure alone acting on the full diaphragm area produces a force greater than the force of supply pressure acting on the opposite, smaller diaphragm area above the ridge. The fluid in the flow path downstream from the ridge is at the exhaust pressure, offering little opposing force to the bias pressure. Thus, while the signal pressure aids in setting, the bias pressure by itself is able to maintain a stable set condition and block the flow path without assistance from the input signal pressure.

The latch circuit will now be described in conjunction with the complete information storage cell. Valve device 11 is an input signal gate for admitting or blocking input pressure signals to select the desired stable state for latch circuit 12. Gate 11 is opened and closed by the fluid pressure supplied on the Write Enable line. Normally, supply fluid at a pressure Ps is present at port 24 and valve 25 is open so that the pressure is sufficient to move diaphragm 18 against ridge 17 in valve 11 and close the flow path. With valve 11 closed, bias pressure in valve 13 is maintained at its full value.

When information is to be stored, for example, either a binary "1" or "0," the Bit In duct 26 is supplied with fluid at the proper pressure corresponding to the information desired, such as high pressure for a "1" and low pressure for a "0." Gating valve 11 is thereafter opened by closing valve 25 to remove or vent the pressure on the diaphragm in gate 11, allowing it to leave its mating ridge. If the bit line has a high pressure, approximately Ps, that pressure will be an increase over the bias pressure Ps/2 and move diaphragm 18 of valve 13 to close off the flow path. Although the signal pressure is approximately the same as the supply pressure for the latch circuit 12, valve 13 will close because its flow path pressure will be less than Ps and somewhere between the supply and exhaust pressures depending upon the flow path impedances. A signal pressure of Ps therefore provides sufficient force to set the diaphragm closed in valve 13. Once closed, the bias pressure is sufficient to maintain that position as described above, and the signal can be removed by thereafter closing gate 25 or reducing the signal pressure. The input bit line pressure must remain until valve 11 is closed. With valve 11 closed, the pressure in chamber 23 returns to the bias pressure.

When an opposite signal of low pressure is applied on the Bit In duct, and gating valve 11 is opened, this allows the bias pressure for valve 13 to decrease substantially so that the upstream supply pressure is able to force the diaphragm away from the ridge to open the flow path in valve 13. Flow restrictor 15, which may be a decrease in duct cross section, is preferably of high impedance to prevent sudden pressure change in the bias supply. Valve 11 may then be closed returning the pressure in control chamber 23 to the bias pressure level and valve 13 remains open since the bias pressure is insufficient to close the diaphragm.

Cell state interrogation is accomplished by using the fluid pressure between valve 13 and restrictor 16 via duct 27 to control flow in valve 14. Valve 14 is located in an interrogation duct 28 connecting a Bit Out duct 29 and Read duct 30. The diaphragm of valve 14 will close off duct 28 if valve 13 is open, and will open duct 28 when valve 13 is closed. An interrogation pulse of high pressure may be applied along either duct 29 or 30, and the state of valve 14 can be sensed on the other. For example, Read valve 31 can be opened to admit some interrogation pressure Pi at port 32 with a pressure sensing device attached to Bit Out duct 29. If no pressure change is detected at Read time, then valve 13 is assumed to be in its open or "0" state.

The storage cell of the invention is particularly adapted to an associative type of store in which interrogation is made of all data words in a store by simultaneously pulsing certain Bit Out ducts in the matrix. Particular words, according to the responses, are then read out as to data bit content by sequentially pulsing Read ducts corresponding to those words so that their bits are sensed in parallel on the Bit Out ducts.

Figure 2:
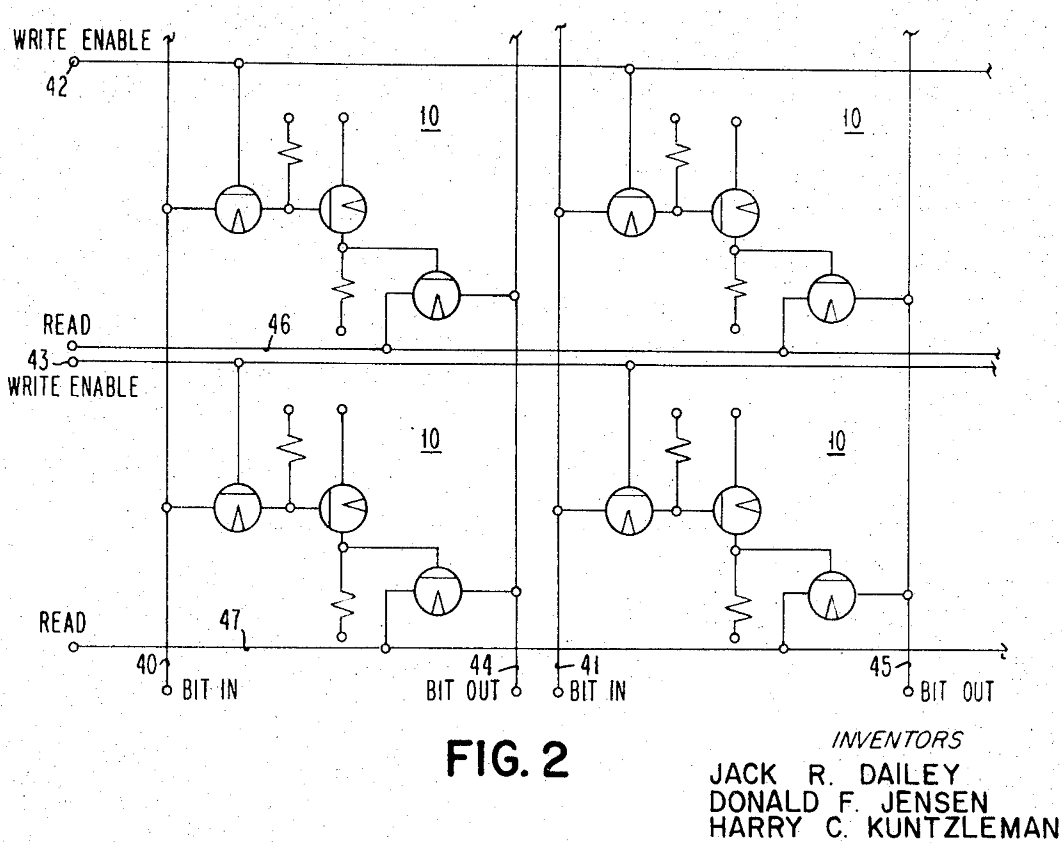
FIG. 2 is a schematic diagram of fluidic storage cells of the type shown in FIG. 1 arranged as a 2 × 2 bit memory matrix.

An example of a 2 × 2 cell matrix arranged for an associative type of store is shown in FIG. 2. A data word is stored by placing appropriate bit pressures on the Bit In ducts 40, 41 and lowering the pressure in Write Enable ducts 42, 43 temporarily to set or reset the cell latches. A parallel word search of the matrix is performed by raising the pressure on selected Bit Out ducts 44, 45 to represent the tag and then sensing Read ducts 46, 47 for words that match the search information. Words can be read out as to data content by then pressurizing the Read ducts and sensing the data bits on the Bit Out ducts for that word.

Figure 3:
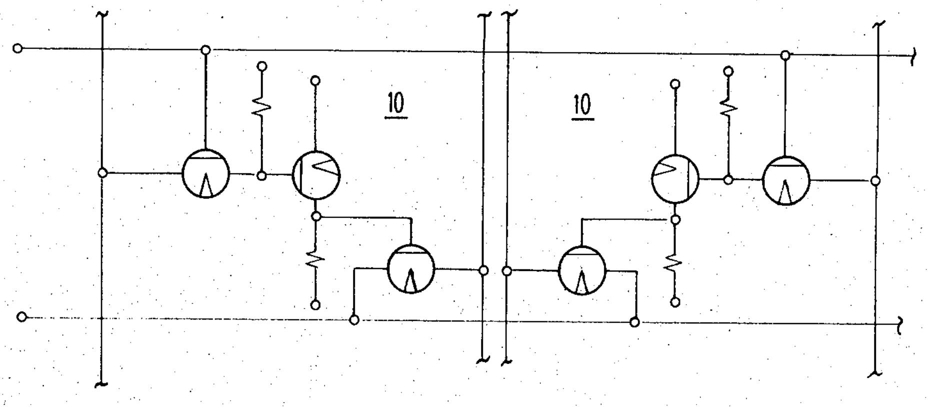
FIG. 3 is a schematic diagram of a functional memory cell composed of two fluidic storage cells, each of the type shown in FIG. 1.

The ready adaptability of the information storage cell to the requirements of a functional memory configuration is shown in FIG. 3. Here, two memory cells 10 are shown together to provide a four-state cell. In the functional memory, a "0" data bit in the cell is represented by "0" in the left cell portion and a "1" in the right cell portion. A cell state of "1" is represented by opposite setting in the two cell halves. Two "don't care" states can then exist when the two cell halves both have a "0" or both have a "1" stored concurrently. These functional memory cells are placed in matrix formation and written and interrogated in a manner similar to that for the associative memory of FIG. 2 except that both cell halves must be written or sensed simultaneously with appropriate ducts. The functional configuration provides more compact multifunction look-up tables for a memory.

Figure 4:
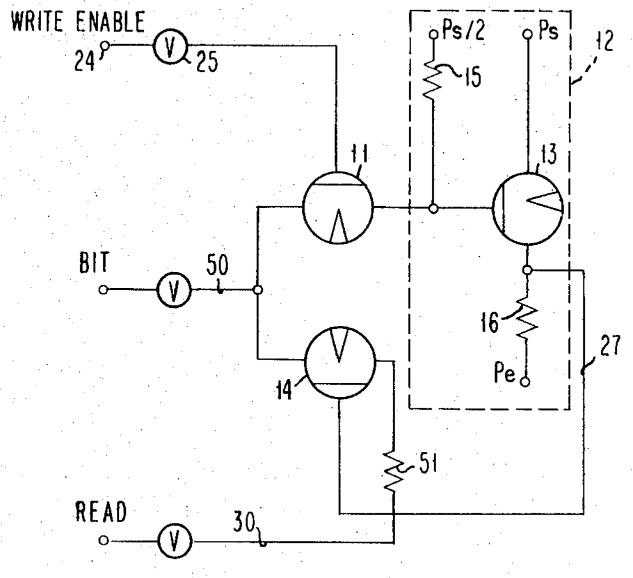
FIG. 4 is a diagram of a modification of the storage cell shown in FIG. 1 to enable operation with a single bit line.

A modification in the duct configuration of the storage cell of FIG. 1 permits elimination of one bit duct and is illustrated in FIG. 4. Both state change and sensing of the cell are accomplished through the single signal duct. State change of the cell is done as before by suitably pressurizing Bit duct 50 and opening gate valve 11 by reducing the pressure on the diaphragm via the Write Enable duct and valve. The bistable latch circuit 12, readout valve 14 and duct 27 thereto from the latch are the same as in FIG. 1. There is a difference, however, in the coupling between the Read duct 30 and Bit duct 50 in that a restrictor 51 is placed in the Read duct preceding the Read valve 14. This restrictor prevents sudden loss of high pressure on the Signal duct during setting of the latch. An increase in pressure in the Read duct is of no moment since sensing does not occur during writing. When readout does occur, the high pressure in duct 30 is transmitted over a longer period of time so that a rise in bit duct pressure can be sensed. Valve 11, of course, blocks pressure changes except during state change time. No definite operating pressures for fluid have been set out in the above description because of the wide range of supply, bias, exhaust and signal pressures, that can be successfully used in the cell configurations. Power consumption is directly affected by the pressures utilized. It is therefore desirable from that aspect to use low pressures. Supply pressures in the range of 1 to 2 psig can be used for the disclosed functions.

The placement of several cells on a common interrogation duct, as in a matrix configuration, can adversely affect sensitivity. For example, in FIGS. 1 and 2, when interrogation ducts 28 of several cells in a single column are connected to a common bit duct 29, there is a possibility of producing an insensible output. When a Read duct 30 for one of the cells is pressurized with valve 14 open, the increase in pressure in Bit duct 29 can feed back to other Read ducts through all valves 14 which happen to be open. The signal pressure could be sufficiently low that the sensing device would fail to recognize the pressure change. This possibility can be overcome by maintaining a slight bias pressure on the diaphragm of valve 14 of all cells by making exhaust pressure Pe slightly positive such as one-tenth the value of the supply pressure. If ridge 17 of valve 14 is so located that equal diaphragm areas are present on opposite sides of the ridge when the bias pressure is 10 percent of the supply pressure $p_s$, then a pressure of 20 percent of the supply pressure would be required to displace the diaphragm. The pressure of 20 percent $P_s$ is acting on only half the diaphragm area. This arrangement would thus assure a minimum pressure change for the sensing devices, and not affect the interrogation signals along either the Read or Bit ducts.

Although the cell has been shown with a separate bias pressure source for valve 13 in FIGS. 1 and 4, the bias pressure can also be obtained using the supply pressure Ps and adding another duct and restrictor in series with restrictor 15 leading to the exhaust. The impedance of the two restrictors would be designed to provide the desired pressure drop at the duct leading to control chamber 23 to result in proper bias pressure. This arrangement results in greater power consumption and tight tolerances in the fabrication of the restrictors, however.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An information storage device comprising:

first valve means having a member therein movable to a position opening and to a position closing a flow path through said valve in response to fluid pressure thereon, said member being in a stable state and representative of stored information in either of said positions, setting means selectively operable to apply fluid pressurized to move said member to one of said states in accordance with information to be stored by said valve;

a selectively pressurizable read flow path;

a selectively operable response flow path;

a duct interconnecting said read and response flow paths; and second valve means in said interconnecting duct and communicating with said flow path through said first valve means so as to be operable in response to the position of said member for opening or closing said duct to either connect or disconnect said read path and said response path, thereby indicating the information stored by said member.

2. Apparatus as described in claim 1 wherein:

said setting means includes means for applying a fluid biasing force urging said member toward said closed position.

3. Apparatus as described in claim 1 wherein:

said setting means includes means for applying fluid to said member at a bias pressure urging said member toward said closed position; and gating means selectively operable to combine said bias fluid with fluid at a pressure representative of said information to produce a resultant pressure moving said member to one of said positions.

4. Apparatus as described in claim 1 wherein:

said second valve means includes an element movable to positions to open and close said duct in response to fluid pressure thereon and said element is subjected to a bias pressure urging said element toward said closed position.

5. Apparatus as described in claim 1 wherein:

said first member in said valve means is a flexible diaphragm and said first valve means includes a wall portion cooperable with said diaphragm to close off said flow path when said diaphragm is in one of said positions.

6. An information storage device comprising:

storage valve means having a member therein movable to a position opening and a position closing a flow path through said valve in response to fluid pressure thereon, said member being in a stable state and representative of information in either of said positions;

setting means selectively operable to apply fluid pressurized to move said member to one of said positions in accordance with the information to be stored, said setting means including an information duct selectively pressurized to variable fluid pressures; and interrogation means for said storage valve means including a duct connecting an interrogation pressure source and said information duct, and a readout valve in said connecting duct having its flow path controlled in response to the position of said member.

7. An information storage device as described in claim 6 wherein:

said connecting duct for said interrogation means includes a flow restrictor.

* * * * *